(12) United States Patent
Yang

(10) Patent No.: US 8,238,436 B2
(45) Date of Patent: Aug. 7, 2012

(54) METHODS AND DEVICE FOR FAST ACQUISITION OF DIGITAL VIDEO SIGNALS

(75) Inventor: Shun-An Yang, Sihu Township, Changhua County (TW)

(73) Assignee: MediaTek Inc. (TW)

( * ) Notice: Subject to any disclaimer, the term of this patent is extended or adjusted under 35 U.S.C. 154(b) by 1522 days.

(21) Appl. No.: 11/731,144

(22) Filed: Mar. 30, 2007

(65) Prior Publication Data

US 2008/0240231 A1 Oct. 2, 2008

(51) Int. Cl.
*H04N 7/12* (2006.01)
(52) U.S. Cl. .................................. 375/240.23
(58) Field of Classification Search .................. None
See application file for complete search history.

(56) References Cited

U.S. PATENT DOCUMENTS

| 6,965,647 | B1 | 11/2005 | Carrig |  |
|---|---|---|---|---|
| 7,203,244 | B2 * | 4/2007 | Alcouffe | 375/260 |
| 2005/0232223 | A1 * | 10/2005 | Muller | 370/350 |
| 2006/0034379 | A1 * | 2/2006 | Yang | 375/260 |
| 2007/0053281 | A1 * | 3/2007 | Schwoerer | 370/208 |
| 2007/0053448 | A1 * | 3/2007 | Schwoerer et al. | 375/260 |
| 2007/0058733 | A1 * | 3/2007 | Masse et al. | 375/260 |
| 2008/0049598 | A1 * | 2/2008 | Ma et al. | 370/208 |
| 2008/0152018 | A1 * | 6/2008 | Ma et al. | 375/240.28 |

FOREIGN PATENT DOCUMENTS

CN 1502172 A1 6/2004

OTHER PUBLICATIONS

James J. Carrig; "Robust Time Domain Block Decoding"; esp@cenet; Chinese Publication No. CN 1502172 (A); Publication Date: Jun. 2, 2004; 2 pgs; Espacenet Worldwide Database.

* cited by examiner

*Primary Examiner* — Gilberto Barron, Jr.
*Assistant Examiner* — Shaun Gregory
(74) *Attorney, Agent, or Firm* — The Law Offices of Andrew D. Fortney; Andrew D. Fortney

(57) ABSTRACT

Methods and systems for receiving, processing and/or decoding digital video transmissions are disclosed. In one embodiment, a method of a method of processing a digital video signal includes the steps of applying an initial set of video transmission parameter values to one or more digital video signal processes, decoding video transmission parameter information from the digital video signal, and updating the initial set of video transmission parameter values with the decoded video transmission parameter information. Embodiments of the present invention can advantageously demodulate and decode a digital video signal before transmission parameters embedded in the signal are completely decoded. Thus, the time to acquire and/or scan a digital video channel is improved.

35 Claims, 4 Drawing Sheets

METHODS AND DEVICE FOR FAST ACQUISITION OF DIGITAL VIDEO SIGNALS

FIELD OF THE INVENTION

The present invention generally relates to the field of digital video processing. More specifically, embodiments of the present invention pertain to methods, algorithms, architectures, circuits, and/or systems for receiving digital video signals and decoding the same prior to correctly and/or reliably decoding transmission parameter information.

DISCUSSION OF THE BACKGROUND

In a digital video broadcasting (DVB) system, the value of certain transmission parameters must be known in order to correctly demodulate and decode a transport stream (e.g., an MPEG-2 or other digitally encoded video and/or audio transport stream) from a terrestrial broadcast carrier. In some systems, parameters may be encoded in the broadcast carrier, so that a conventional receiver must begin demodulating and decoding a carrier signal before the transport stream can be recovered. Two such systems are the Digital Video Broadcasting-Terrestrial (DVB-T) and Digital Video Broadcasting-Handheld (DVB-H) standards proposed by the European Telecommunications Standards Institute (ETSI), defining baseline transmission systems for digital television broadcasting.

Referring now to FIG. 1, a functional block diagram of an exemplary conventional DVB encoding and modulation system 100 according to the ETSI DVB-T/H standards is shown. The output of an MPEG-2 transport multiplexer 110 is generally encoded and modulated onto a broadcast carrier by DVB system 112. DVB system 112 may process the transport stream through transport multiplex adaptation and randomization (e.g., for energy dispersal) module 120, outer coder (e.g., using a Reed-Solomon code) 121, outer interleaver (e.g., using convolutional interleaving) 122, inner coder (e.g., using a punctured convolutional code) 123, inner interleaver 124, mapper 125, frame adaptation module 126, Orthogonal Frequency Division Multiplexer (OFDM) 128, guard interval inserter 129, and digital-to-analog converter (DAC) 130. Transmission parameters may be inserted by the frame adaptation module in response to transmission parameter signaling (TPS) module 127.

A variety of transmission parameters may affect the encoding and modulation (and thereby affect the subsequent demodulation and decoding) of the transport stream. For example, two modes of operation are defined: a "2K mode" and an "8K mode." The "2K mode" is suitable for single transmitter operation and for small single frequency networks with limited transmitter distances. The "8K mode" can be used both for single transmitter operation and for small and large single frequency networks.

The transmission parameters may also specify a modulation type. The system supports QPSK and different levels of QAM modulation and different inner code rates to be used to trade bit rate versus ruggedness. The system also supports two level hierarchical channel coding and modulation, including uniform and multiresolution constellation. Data carriers in one OFDM frame are generally modulated using QPSK, 16-QAM, 64-QAM, non-uniform 16-QAM, or non-uniform 64-QAM constellations. The proportions of the constellations generally depend on a transmission parameter α, which can take the three values 1, 2, or 4, where α is the minimum distance separating two constellation points carrying different high priority (HP) bit values divided by the minimum distance separating any two constellation points.

In the multi-resolution case, referring again to FIG. 1, splitter 111 may separate the incoming transport stream into two independent MPEG transport streams, referred to as the high-priority and the low-priority stream. These two bitstreams may be mapped onto the signal constellation by the mapper 125 and/or modulator 128.

The inner coder 123 may encode the data using a range of punctured convolutional codes, based on a mother convolutional code of rate ½ with 64 states, generally allowing selection of the most appropriate level of error correction for a given service or data rate in either non-hierarchical or hierarchical transmission mode. In addition to the mother code of rate ½ the system supports punctured code rates of ⅔, ¾, ⅚ and ⅞. If two level hierarchical transmission is used, each of the two parallel channel encoders 123 and 134 may have its own independent code rate. The code rate used is generally encoded as a transmission parameter.

In the ETSI DVB-T/H standards, TPS carriers are used for the purpose of signaling parameters related to the transmission scheme (e.g., channel coding, modulation, etc.). The TPS is transmitted in parallel on 17 TPS carriers for the 2K mode and on 68 carriers for the 8K mode. Every TPS carrier in the same symbol conveys the same differentially encoded information bit. Referring now to FIG. 2, the carrier indices for TPS carriers in an OFDM symbol (e.g., a symbol comprising 6,817 carriers in the 8K mode or a symbol comprising 1,705 carriers in the 2K mode) are shown. In addition to the TPS carriers, an OFDM frame generally contains transmitted data and scattered pilot cells and continual pilot carriers.

Referring now to FIG. 3, the structure of a fully decoded TPS data block is shown. The first segment 310 of the TPS data block (bit so) is an initialization bit for a differential binary phase shift keying (2-PSK) modulation. The modulation of the TPS initialization bit is derived from a pseudo-random binary sequence. The second segment 320 of the TPS data block (bits $s_1$-$s_{16}$) is a synchronization word. The first and third TPS block in each super-frame (e.g., each group of four OFDM frames) have the synchronization word $s_1$-$s_{16}$=0011010111101110. The second and fourth TPS block have the synchronization word $s_1$-$s_{16}$=1100101000010001 (e.g., a binary complement of the synchronization words of the first and third TPS blocks). The next segment 330 of the TPS data block (bits $s_{17}$-$s_{22}$) is used as a TPS length indicator (binary count) to signal the number of used bits of the TPS. At present this length indicator has the value $s_{17}$-$s_{22}$=010111 if cell identification is not supported and the value $s_{17}$-$s_{22}$=011111 if the cell identification is supported.

Segments 340 (bits $s_{23}$-$s_{39}$) and 350 (bits $s_{40}$-$s_{53}$) generally comprise the usable transmission parameters. The bits in segment 340 currently defined, while segment 350 is reserved in the ETSI DVB-T/H standards for future use. Segment 360 of the TPS data block (bits $s_{54}$-$s_{67}$ comprises a Bose-Chaudhuri-Hocquenghem (BCH) error correction code (ECC).

Segment 341 (bits $s_{23}$-$s_{24}$) designates a frame number within an OFDM super-frame. Segment 342 (bits $s_{25}$-$s_{26}$) designate a constellation (e.g., QPSK, 16-QAM, or 64-QAM). Segment 343 (bits $s_{27}$-$s_{29}$) specify whether the transmission is hierarchical and, if so, the value of α. Segment 344 (bits $s_{30}$-$s_{32}$) specifies the code rate when non-hierarchical channel coding and modulation are used. When hierarchical channel coding and modulation are used segment 344 specifies the code rate of for the high priority level of the modulation and segment 355 (bits $s_{33}$-$s_{35}$) specifies the code rate for the lower priority level of the modulation. Segment 346 (bits $s_{36}$-$s_{37}$) specifies the value of the guard interval, and segment 347 (bits $s_{38}$-$s_{39}$) specifies the transmission mode (e.g., 2K mode or 8K mode).

A conventional approach to decoding and demodulating the video stream is to first decode the TPS information before de-interleaving, de-mapping and decoding the received signals. One drawback of this approach that TPS information is distributed over an OFDM frame. In the worst case (e.g., when reception begins after a frame has started, thereby requiring a second frame in order to completely decode and verify a block of TPS data), it may take up to 135 symbols to receive a complete OFDM frame. In particular, the last bits of the TPS data block comprising the BCH error correcting code must be decoded before the transmission parameters can be completely verified. Thus, in some transmission modes, it may take more than 130 milliseconds to receive a complete frame, thereby delaying decoding and demodulation of the received video signal.

Therefore it is desirable to provide a faster approach for decoding digital video signals with a reasonable degree of reliability.

SUMMARY OF THE INVENTION

Embodiments of the present invention pertain to methods and systems for fast acquisition of a digital video signal. In one embodiment, a method of processing a digital video signal includes the steps of applying an initial set of video transmission parameter values to one or more digital video signal processes, decoding video transmission parameter information from the digital video signal, and updating the initial set of video transmission parameter values with the decoded video transmission parameter information.

In another embodiment, a method of processing a digital video signal may include the steps of applying an initial set of video transmission parameter values to one or more digital video signal processes, demodulating video transmission parameter information to obtain raw parameter data, and updating the initial set of video transmission parameter values with the raw parameter data to provide an intermediate set of video transmission parameter values.

In yet another embodiment, a device may comprise a digital video receiver having a demapper configured to demodulate a digital video signal, one or more decoder blocks configured to determine values of the demodulated digital video signal and/or lock a decoded digital video bitstream to a reference signal, and a memory adapted to store an initial set of video transmission parameter values, wherein the demapper and/or the decoder block(s) apply the initial set of video transmission parameter values to the digital video signal and/or demodulated digital video signal.

Embodiments of the present invention can advantageously demodulate and decode a digital video signal before transmission parameters embedded in the signal are completely decoded. Thus, the time to acquire and/or scan a digital video channel is improved. These and other advantages of the present invention will become readily apparent from the detailed description of preferred embodiments below.

DETAILED DESCRIPTION OF THE PREFERRED EMBODIMENTS

Figure 1:
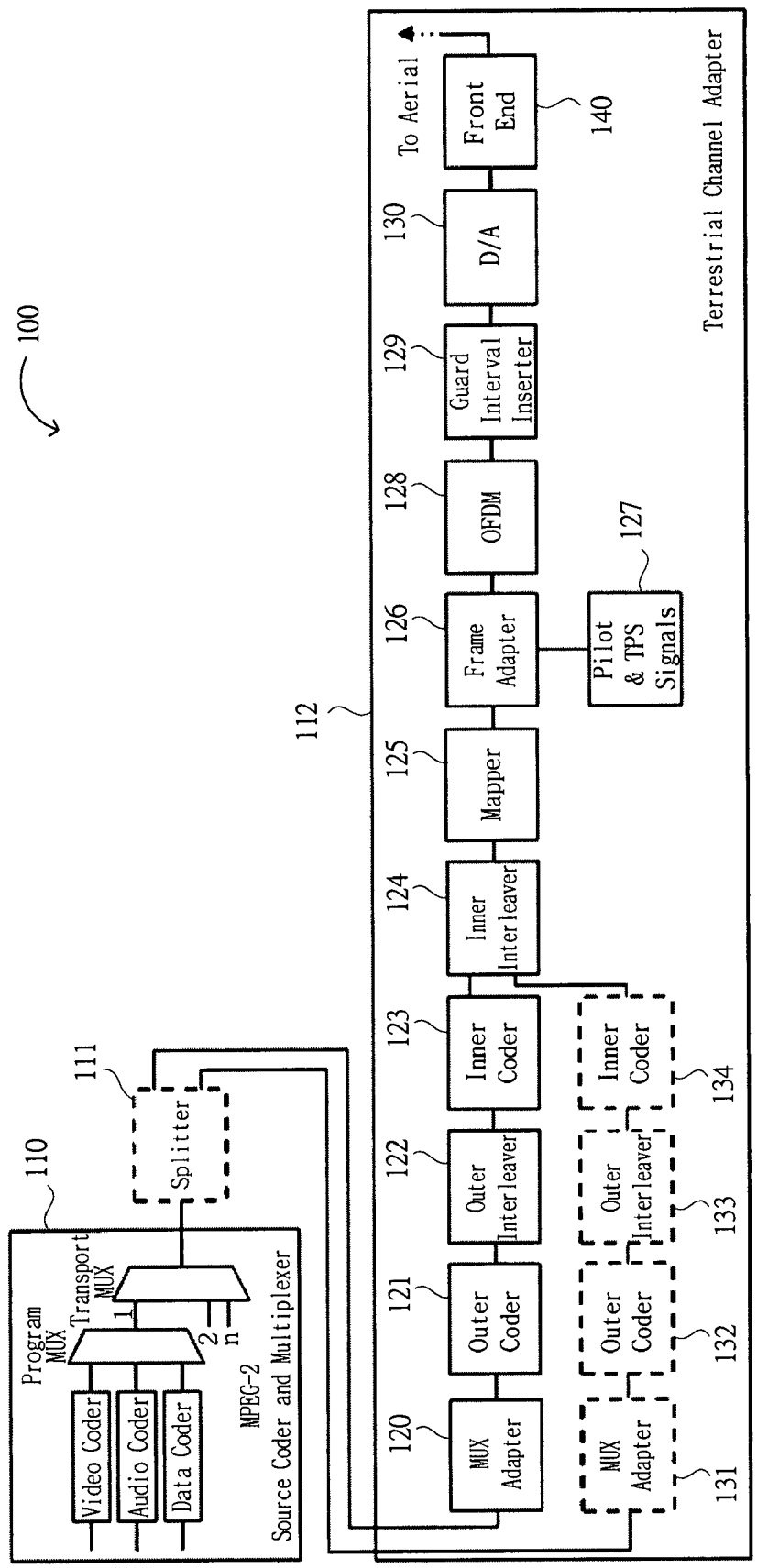
FIG. 1 is a functional block diagram of an exemplary conventional DVB encoding and modulation system.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, data streams, or waveforms within a computer, processor, controller, and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain," "predefined" and "predetermined" generally refer to a value, quantity, parameter, constraint, condition, state, process, procedure, method, practice, or combination thereof that is, in theory, variable, but is typically set in advance and is generally not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, as may (a) the terms "flip-flop," "latch" and "register," and (b) the terms "connected to," "coupled with," "coupled to," and "in communication with," (which may refer to direct or indirect connections, couplings, or communications) but these terms are generally given their art-recognized meanings herein.

Embodiments of the present invention pertain to methods and systems for fast acquisition of a digital video signal. Embodiments of the present invention can advantageously demodulate and decode a digital video signal before transmission parameters embedded in the signal are completely decoded. Thus, the time to acquire and/or scan a digital video channel is improved. The invention, in its various aspects, will be explained in greater detail below with regard to exemplary embodiments.

An Exemplary Method of Decoding a Signal

Figure 4:
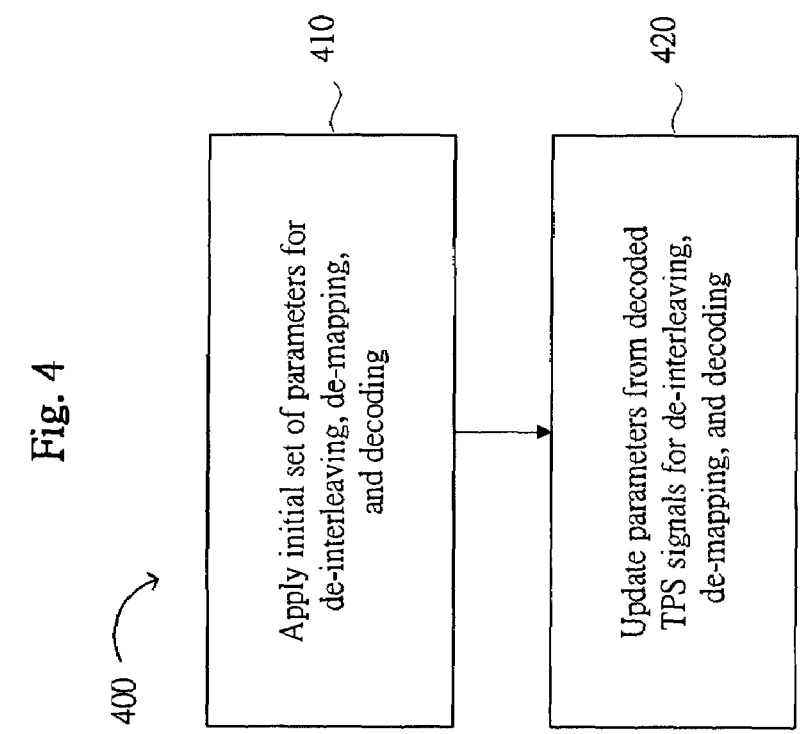
FIG. 4 is a flow diagram of an exemplary method of processing a digital video signal in accordance with embodiments of the present invention.

FIG. 4 shows a flow diagram 400 of an exemplary method of processing a digital video signal in accordance with embodiments of the present invention. At step 410, an initial set of video transmission parameter values are applied to one or more digital video signal processes. At step 420, the initial set of video transmission parameter values are updated with video transmission parameter information after decoding the video transmission parameter information from the digital video signal. Thus, the initial set of parameters is updated with the parameter values that are actually transmitted with the digital video signal (e.g., after a complete TPS block has been decoded from a received OFDM frame).

In embodiments of the present invention, an initial assumption is made as to correct transmission parameters to use to decode and demodulate the digital video signal. If the initial assumption is correct, a receiver can decode the signal earlier without a need to wait for transmission parameter information to be completely received and decoded. In many digital video broadcast systems (e.g., in regions and/or countries that have adopted the ETSI DVB-T and/or DVB-H standards), one or more of the transmission parameters may be relatively fixed. Therefore, if the initial parameter values are selected carefully (e.g., based on region-specific pre-defined parameters and/or previously received parameters) there is a high likelihood that the initial parameters will be correct. However, even if the initial assumption is incorrect and the receiver cannot decode and/or demodulate the digital video stream earlier, the transmission parameters can be updated when reliable (e.g., fully decoded, demodulated, and error corrected) TPS information is available. Thus, in the worst case, the present method is no slower than the conventional method.

In a further embodiment, the video transmission parameter information comprises a plurality of transmission parameter signaling (TPS) bits. The plurality of transmission parameter signaling (TPS) bits may comprise positive synchronization bits and negative synchronization bits (e.g., synchronization segment 320 of TPS block 300, as described above and shown in FIG. 3), each one of the negative synchronization bits having a respective opposite positive synchronization bit.

The initial set of video transmission parameter values may be applied to the one or more digital video signal processes prior to correctly decoding the TPS bits (e.g., prior to decoding the TPS bits that are actually encoded in the carrier signal). Thus, the video decoder can "guess" the correct TPS values. If the initial values used are correct, then demodulation, de-interleaving, and decoding of the video signal can begin immediately, without waiting for a complete frame containing all of the transmitted TPS values to arrive.

In another embodiment, the initial set of video transmission parameter values may include values for an interleaving type, a hierarchy (e.g., αvalues designated in TPS data segment 343), a constellation (e.g., QPSK, 16-QAM, or 64-QAM, designated in TPS data segment 342), and/or a code rate (e.g., ½, ⅔, ¾, etc., designated in TPS data segment 344). In yet another embodiment, the initial set of video transmission parameter values may include values for a guard interval (e.g., TPS data segment 346), a transmission mode (e.g., 2K mode or 8K mode, designated in TPS data segment 347), a frame number (e.g., TPS data segment 341), and/or a cell identifier (e.g., TPS data segment 348).

In another embodiment, the method further includes a step of receiving the digital video signal from a first channel, wherein the initial set of video transmission parameter values comprises a previous set of video transmission parameter values. The previous set of video transmission parameter values may include values from a previous digital video signal transmission on a different channel and/or values from a previous digital video signal transmission on the first channel. The initial and/or updated transmission parameters may advantageously be applied to steps of de-interleaving the digital video signal, demapping the de-interleaved digital video signal, and decoding the demapped digital video signal.

An Exemplary Method of Decoding a Signal with Intermediate Parameters

Figure 5:
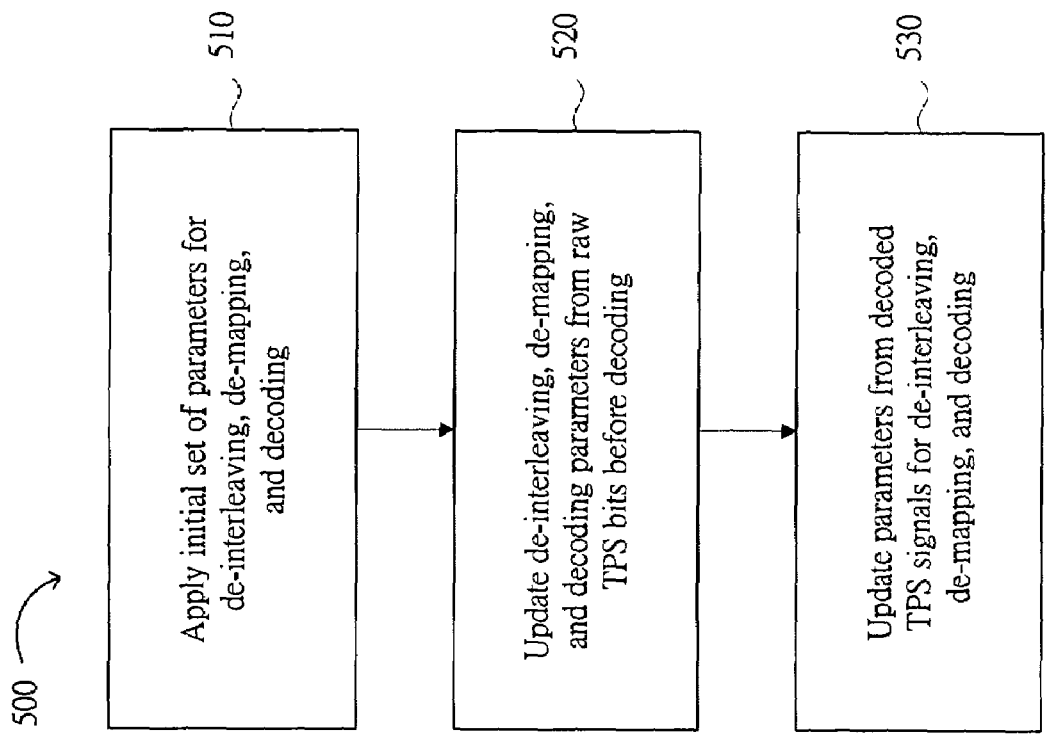
FIG. 5 is a flow diagram of an alternate method of processing a digital video signal in accordance with embodiments of the present invention.

FIG. 5 shows a flow diagram 500 of an alternate method of processing a digital video signal in accordance with embodiments of the present invention. At step 510, an initial set of video transmission parameter values are applied to one or more digital video signal processes (e.g., to de-interleaving, de-mapping, and/or decoding processes). At step 520, video transmission parameter information may be decoded and/or demodulated from the digital video signal to obtain raw parameter data (e.g., parameter data that has not been error corrected), and the initial set of video transmission parameter values may be updated with the raw parameter data to provide an intermediate set of video transmission parameter values.

Figures 2, 3:
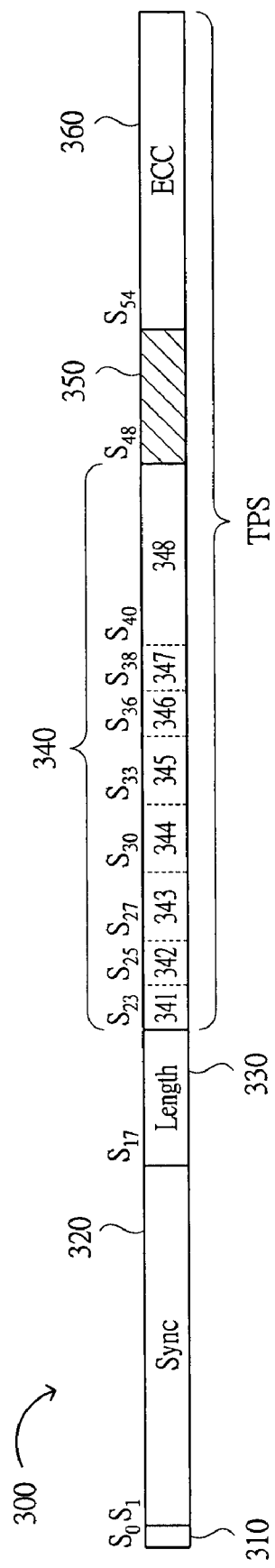
FIG. 2 is a table of carrier indices for transmission parameter signaling (TPS) carriers in an OFDM symbol.
FIG. 3 is a diagram of the structure of a transmission parameter signaling (TPS) block.

As shown in FIG. 3, a TPS block 300 according to the DVB-T/H standards includes a BCH error correction code (ECC) block 360. The ECC block is generally at the end of the TPS block. In addition, the ECC block must be decoded and compared to a reference block (as is known in the art) in order to detect and/or correct transmission errors in the block. Thus, an entire TPS block (and the entire ODFM frame in which the TPS block is encoded) must be received from start to finish before the TPS data can be completely decoded and error-checked. However, according to this embodiment of the present invention, the raw (non-error-corrected) TPS bits may be used before the ECC is received, even if the reception of the digital video signal begins in the middle of a frame (e.g., as long as reception begins before bit s23, the raw transmission parameter bits encoded from bits $s_{23}$ to $s_{47}$ may still be usable).

Referring again to FIG. 5, at step 530 the method may include updating the intermediate set of video transmission parameter values with the decoded and error-checked video transmission parameter information to provide a final set of video transmission parameter values. Thus, the method may further include steps of demodulating and/or decoding an ECC block (e.g., ECC block 360 in FIG. 3), comparing the decoded ECC block to a calculated ECC block, and/or checking for and/or correcting errors in the transmission parameter values using the ECC block. In a preferred embodiment, however, the digital video signal is decoded before all of the video transmission parameter information is decoded and error-checked. The video transmission parameter information may comprise a plurality of transmission parameter signaling (TPS) bits (e.g., data bits $s_{23}$-$s_{47}$ of TPS block 300). The initial set of video transmission parameter values may comprise values for an interleaving type, a hierarchy, a constellation, and/or a code rate.

In another embodiment, the initial set of video transmission parameter values consists of a previous set of video transmission parameter values. The previous set of video transmission parameter values may include values from a previous digital video signal transmission on a different channel and/or values from a previous digital video signal transmission on the first channel. As described above, in many digital video broadcast systems one or more of the transmission parameters may be relatively fixed. Therefore, initial parameter values that are based on previously received parameters (either for the same channel or a different channel) are likely to be correct.

In yet another embodiment, the digital video signal processes include de-interleaving the digital video signal, demapping the de-interleaved digital video signal, and/or decoding the demapped digital video signal.

An Exemplary Digital Video Receiver

A device according to the present invention may comprise a digital video receiver having a demapper configured to demodulate a digital video signal, one or more decoder blocks configured to determine values of the demodulated digital video signal and/or lock a decoded digital video bitstream to a reference signal, and a memory adapted to store an initial set of video transmission parameter values, wherein the demapper and/or the decoder block(s) apply the initial set of video transmission parameter values to the digital video signal and/or demodulated digital video signal. In one embodiment, the initial set of video transmission parameter values may include values for an interleaving type, a hierarchy, a constellation, a code rate, a guard interval, a transmission mode, a frame number, and/or a cell identifier.

The memory (e.g., the memory configured to provide transmission parameters to symbol de-interleaver 640, demapper 650, and/or convolutional decoder 670 of the digital video receiver 600 in FIG. 6) may comprise one or more registers configured to (i) provide the initial set of video transmission parameter values to the demapper and/or decoder block(s) and (ii) receive and store updated video transmission parameter values. In a further embodiment, the updated video transmission parameter values may be derived from an output of the one or more decoder blocks (e.g., after demodulating and error-correcting an entire TPS block). In another embodiment, the updated video transmission parameter values are derived from an output of a demodulator for the TPS information prior to processing the digital video signal through the decoder blocks.

The digital video receiver may further comprise a de-interleaver configured to de-interleave the digital video signal. The de-interleaver may include a symbol de-interleaver (e.g., symbol de-interleaver 640 in FIG. 6) configured to de-interleave the digital video signal and/or a bit de-interleaver (e.g., bit de-interleaver 660) configured to de-interleave the demodulated digital video signal.

In another embodiment, the digital video receiver may include an outer de-interleaver (e.g., outer de-interleaver 680 in FIG. 6) configured to de-interleave the decoded digital video bitstream. In yet another embodiment, the digital video receiver may include a synchronizer (e.g., synchronizer 620) configured to synchronize the digital video signal to a predetermined location, a predetermined frequency, or a predetermined time reference. The synchronizer may be further configured to perform a fast Fourier transform on the digital video signal.

The digital video receiver may include an equalizer (e.g., equalizer 630 in FIG. 6) between the synchronizer and the demapper, configured to amplify and/or filter the digital video signal. The digital video receiver may also include an analog-to-digital converter configured to convert an analog video signal to the digital video signal. The operation of the various receiver components will now be explained with reference to FIG. 6.

Figure 6:
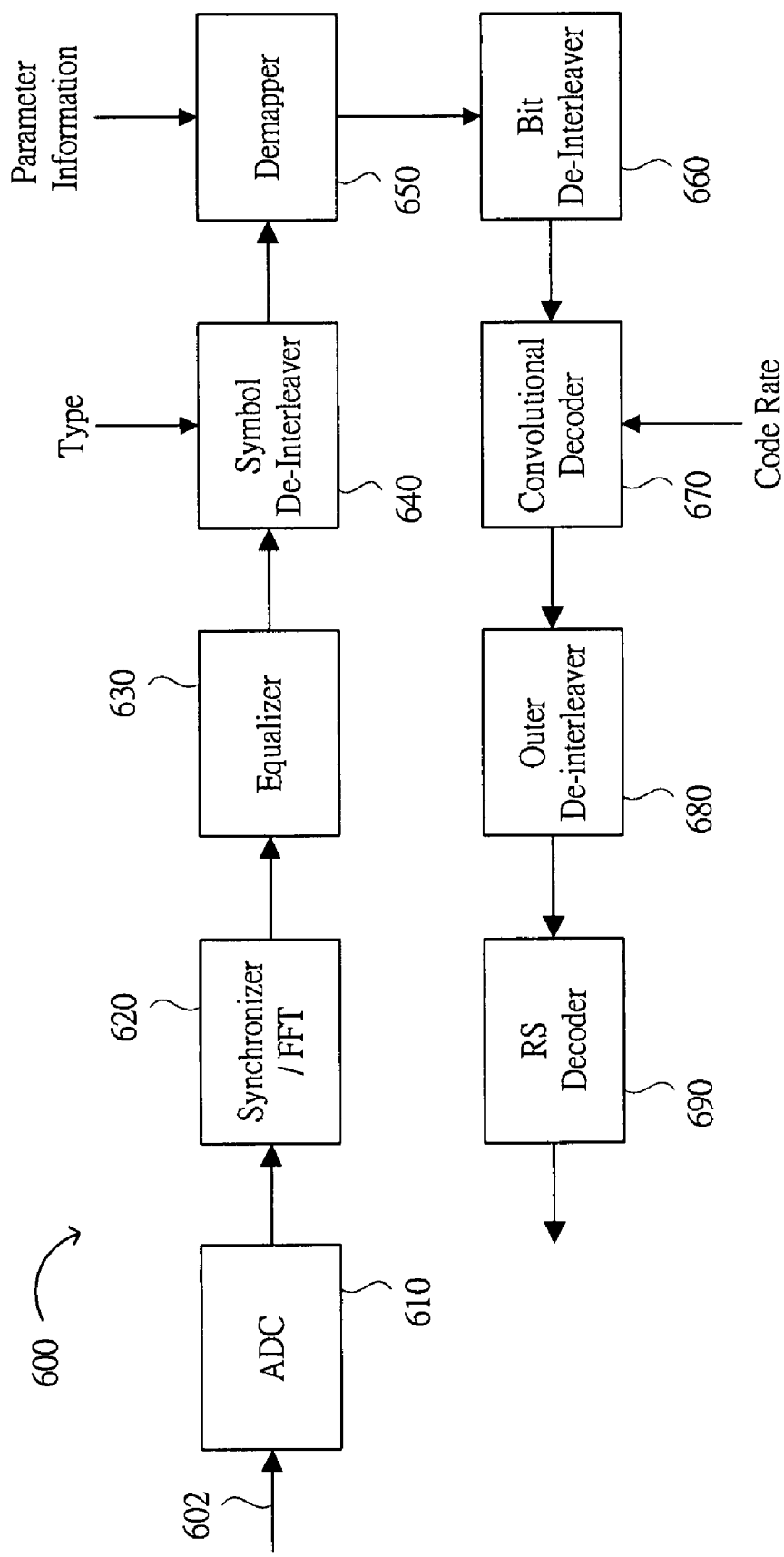
FIG. 6 is a functional block diagram of a digital video receiver according to the present invention.

FIG. 6 shows a functional block diagram of a digital video receiver according to the present invention. Analog-to-digital converter (ADC) 610 generally samples analog signal 602 (e.g., an analog broadcast carrier signal encoded and modulated according to a DVB standard) to produce a digital output. Synchronizer/FFT module 620 synchronizes the receiver to the incoming signal and extracts a subcarrier using a fast Fourier transform (FFT). Module 620 generally finds the boundary between a guard interval and a useful symbol interval in the received signal and performs FFT window timing synchronization in order to perform FFT with respect to only the useful symbols in the signal. The module may determine the start point of a symbol using a guard interval (e.g., a guard interval as designated in segment 346 of TPS block 300 in FIG. 3). Referring again to FIG. 6, equalizer 630 equalizes the output of synchronizer 620.

The symbols in a DVB-T/H signal are interleaved to map vbit words onto the 1,512 (in 2K mode) or 6,048 (in 8K mode) active carriers per symbol, where v=2 for QPSK, v=4 for 16-QAM, and v=6 for 64-QAM. Therefore, according to the present invention, symbol de-interleaver 640 may be configured to receive initial transmission parameters and updated transmission parameters (e.g., from a memory), each of which may include signal type information such as the modulation type and transmission mode.

Demapper 650 generally recovers a digital bit sequence from a base band modulated sequence of complex symbols. In the DVB-T/H standards, the bits may be modulated using QPSK, 16-QAM, or 64-QAM. In addition, the modulation may be hierarchical, in which case the constellation ratio a must be known. Therefore, according to the present invention demapper 650 may be configured to receive initial and updated transmission parameters in order to demodulate and/or demap the baseband signal. In particular, demapper 650 may receive parameters relating to the constellation type (e.g., QPSK, 16-QAM, or 64-QAM as designated in segment 342 of TPS block 300 in FIG. 3) and/or hierarchy mode and a value (e.g., TPS segment 343).

Bit de-interleaver 660 reverses the bit-wise interleaving of the digital data stream as specified in the DVB-T/H standards. Convolutional decoder 670 reverses the convolutional encoding of the digital data stream. A digital data stream, under the DVB-T/H standards, may be encoded the data using a range of punctured convolutional codes, based on a mother convolutional code of rate ½ with 64 states, generally allowing selection of the most appropriate level of error correction for a given service or data rate in either non-hierarchical or hierarchical transmission mode. In addition to the mother code of rate ½, the system supports punctured code rates of ⅔, ¾, ⅚ and ⅞. If two level hierarchical transmission is used, each of the two parallel channels may have its own independent code rate. Therefore, according to the present invention, convolutional decoder 670 may be configured to receive initial and updated transmission parameters in order to decode the digital data stream. In particular, convolutional decoder 670 may receive parameters relating to the code rate of one or both hierarchical channels (e.g., TPS blocks 344 and/or 345).

Outer de-interleaver 680 is generally configured to de-interleave the decoded digital video bitstream. In a DVB-T/H system, convolutional interleaving is generally used to rearrange the transmitted data sequence, such that it becomes more resilient with respect to long sequences of errors. Reed-Solomon (RS) decoder 690 is generally a block decoder configured to enable correction of errors in the decoded digital video bitstream and locking of the decoded digital video bitstream to a reference signal. RS decoder 690 is a type of BCH decoder. In a DVT-T/H system, the RS encoding is a non-binary block code, allowing the correction of up to a maximum of 8 bytes for each 188-byte packet.

While the above examples primarily include applications to digital video broadcasting, one skilled in the art will recognize that other signals (video, audio, data, and combinations thereof) may also be decoded in accordance with embodiments of the invention. Further, one skilled in the art will recognize that other variations of the decoding methods and hardware described herein may also be used in accordance with embodiments of the invention.

Conclusions

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of processing a digital video signal, comprising:
    prior to decoding video transmission parameter information from the digital video signal, applying an initial set of video transmission parameter values to one or more digital video signal processes;
    decoding said video transmission parameter information from the digital video signal; and
    updating the initial set of video transmission parameter values with the decoded video transmission parameter information.

2. The method of claim 1, wherein said video transmission parameter information comprises a plurality of transmission parameter signaling (TPS) bits.

3. The method of claim 1, wherein said initial set of video transmission parameter values comprises values for an interleaving type, a hierarchy, a constellation, and a code rate.

4. The method of claim 1, wherein said initial set of video transmission parameter values comprises values for at least one of a guard interval, a transmission mode, a frame number, and a cell identifier.

5. The method of claim 1, further comprising receiving the digital video signal from a first channel, wherein said initial set of video transmission parameter values comprises a previous set of video transmission parameter values.

6. The method of claim 5, wherein said previous set of video transmission parameter values include values from a previous digital video signal transmission on a different channel.

7. The method of claim 5, wherein said previous set of video transmission parameter values include values from a previous digital video signal transmission on the first channel.

8. The method of claim 1, wherein said digital video signal processes include de-interleaving said digital video signal, demapping the de-interleaved digital video signal, and decoding the demapped digital video signal.

9. The method of claim 2, wherein said plurality of transmission parameter signaling (TPS) bits comprises positive synchronization bits and negative synchronization bits, each one of said negative synchronization bits having a respective opposite positive synchronization bit.

10. A method of processing a digital video signal, comprising:
    prior to obtaining raw parameter data from the digital video signal, applying an initial set of video transmission parameter values to one or more digital video signal processes;
    demodulating video transmission parameter information to obtain said raw parameter data; and
    updating the initial set of video transmission parameter values with the raw parameter data to provide an intermediate set of video transmission parameter values.

11. The method of claim 10, further comprising decoding and error-checking the video transmission parameter information.

12. The method of claim 11, further comprising updating the intermediate set of video transmission parameter values with the decoded and error-checked video transmission parameter information to provide a final set of video transmission parameter values.

13. The method of claim 11, further comprising decoding the digital video signal before all of the video transmission parameter information is decoded and error-checked.

14. The method of claim 10, wherein said video transmission parameter information comprises a plurality of transmission parameter signaling (TPS) bits.

15. The method of claim 10, wherein said initial set of video transmission parameter values comprises values for an interleaving type, a hierarchy, a constellation, and a code rate.

16. The method of claim 10, further comprising receiving the digital video signal from a first channel, wherein said initial set of video transmission parameter values consists of a previous set of video transmission parameter values.

17. The method of claim 16, wherein said previous set of video transmission parameter values include values from a previous digital video signal transmission on a different channel.

18. The method of claim 16, wherein said previous set of video transmission parameter values include values from a previous digital video signal transmission on the first channel.

19. The method of claim 10, wherein said digital video signal processes include de-interleaving said digital video signal, demapping the de-interleaved digital video signal, and decoding the demapped digital video signal.

20. A digital video receiver, comprising:
a demapper configured to demodulate a digital video signal;
one or more decoder blocks configured to determine values of the demodulated digital video signal and/or lock a decoded digital video bitstream to a reference signal; and
a memory adapted to store an initial set of video transmission parameter values, wherein the demapper and/or the decoder block(s) apply the initial set of video transmission parameter values to the digital video signal and/or demodulated digital video signal prior to decoding video transmission parameter information from the digital video signal.

21. The digital video receiver of claim 20, wherein said memory comprises a register configured to (i) provide said initial set of video transmission parameter values to said demapper and/or decoder block(s) and (ii) receive and store updated video transmission parameter values.

22. The digital video receiver of claim 21, wherein said updated video transmission parameter values are derived from an output of said one or more decoder blocks.

23. The digital video receiver of claim 20, wherein said initial set of video transmission parameter values comprises values for an interleaving type, a hierarchy, a constellation, and a code rate.

24. The digital video receiver of claim 23, wherein said initial set of video transmission parameter values further comprises values for one or more of a guard interval, a transmission mode, a frame number, and a cell identifier.

25. The digital video receiver of claim 20, wherein said one or more decoder blocks comprise:

a convolutional decoder configured to determine values of the demodulated digital video signal and generate the decoded digital video bitstream; and
a block decoder configured to enable correction of errors in the decoded digital video bitstream and locking of the decoded digital video bitstream to a reference signal.

26. The digital video receiver of claim 25, wherein said block decoder comprises a BCH decoder.

27. The digital video receiver of claim 26, wherein said BCH decoder comprises a Reed-Solomon decoder.

28. The digital video receiver of claim 20, further comprising a de-interleaver configured to de-interleave the digital video signal.

29. The digital video receiver of claim 28, wherein said de-interleaver comprises:
a symbol de-interleaver configured to de-interleave the digital video signal; and
a bit de-interleaver configured to de-interleave the demodulated digital video signal.

30. The digital video receiver of claim 29, further comprising an outer de-interleaver configured to de-interleave the decoded digital video bitstream.

31. The digital video receiver of claim 20, further comprising a synchronizer configured to synchronize the digital video signal to a predetermined location, a predetermined frequency, or a predetermined time reference.

32. The digital video receiver of claim 31, wherein the synchronizer is further configured to perform a fast Fourier transform on the digital video signal.

33. The digital video receiver of claim 31, further comprising an equalizer between the synchronizer and the demapper, configured to amplify and/or filter the digital video signal.

34. The digital video receiver of claim 31, further comprising an analog-to-digital converter configured to convert an analog video signal to the digital video signal.

35. The digital video receiver of claim 21, wherein said updated video transmission parameter values are derived from an output of a demodulator for said TPS information prior to processing the digital video signal through said decoder blocks.

* * * * *